Figure 1:
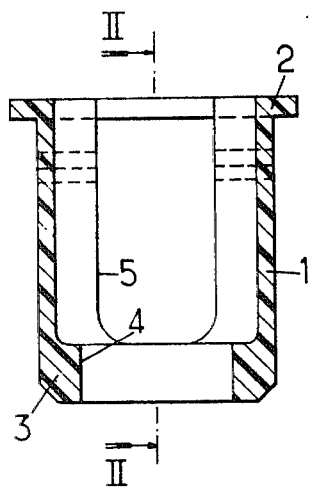

United States Patent [19]

Moryl et al.

[11] 4,303,361
[45] Dec. 1, 1981

[54] DEVICES FOR FIXING OBJECTS TO METAL PLATES ACCESSIBLE FROM ONLY ONE SIDE

[75] Inventors: Richard Moryl, Maisons-Laffitte; Roger Bouery, Valmondois, both of France

[73] Assignee: C.O.M.E.T. Compagnie de Material et d'Equipement Techniques, Senlis, France

[21] Appl. No.: 127,548

[22] Filed: Mar. 6, 1980

[30] Foreign Application Priority Data

Mar. 7, 1979 [FR] France .................. 79 05883

[51] Int. Cl.³ ........................... F16B 37/04
[52] U.S. Cl. .................................. 411/108
[58] Field of Search .......... 151/41.76, 41.75, 69; 85/32 K; 411/108, 103, 111

[56] References Cited

U.S. PATENT DOCUMENTS 2,784,759  3/1957  Modrey ................. 151/41.75
3,534,797 10/1970  Reinhard ............... 151/41.75
3,574,899  4/1971  Fisher ................ 151/41.75 X
3,729,040  4/1973  Whiteside ............ 151/41.76 X

FOREIGN PATENT DOCUMENTS 1273149  5/1972  United Kingdom ........... 151/41.76

Primary Examiner—Ramon S. Britts
Attorney, Agent, or Firm—Cushman, Darby & Cushman

[57] ABSTRACT

A cage for fixing an object by screwing it to a rectangular hole of width a having parallel edges and provided in a metal plate accessible from only one side, comprises a cylindrical socket extended by a collar, the dimension of the socket in a first transverse direction being at most equal to a and two tongues extending from this socket in the transverse direction perpendicular to the preceding one so as to form with the collar two slides adapted to overlap the edges after axial insertion of the cage into the slit, then rotation of this cage by a quarter of a turn in the screwing direction, this rotation bringing into play over-riding of a hard point.

6 Claims, 4 Drawing Figures

DEVICES FOR FIXING OBJECTS TO METAL PLATES ACCESSIBLE FROM ONLY ONE SIDE

The invention relates to devices for fixing objects by screwing them to supports, such as metal plates, which are "blind", i.e. accessible from only one side and provided with appropriate through-holes through which the devices in question partly pass, as is frequently required in bodywork construction for road, railway, aeronautic or similar vehicles, or even in the construction of household equipment.

It relates more particularly among fixing devices of the kind in question to those which comprise two independent screwing elements adapted to cooperate with each other, the first of which comprises a monobloc cage made from plastic material formed by a cylindrical or prismatic socket small enough in section to be inserted in the mounting holes of the metal plate or similar support, one of the ends of this socket being extended transversely by a collar adapted to bear against the edges of said holes after insertion of said socket therein.

It relates more particularly still to those of the above fixing devices for which the mounting holes are slits with parallel edges—whose width will be designated as being equal to a hereafter—the position of these devices being adjustable after mounting in the direction of these edges : for this purpose, in the devices of the kind considered, the socket of the cage has, on the one hand, at all points thereof a dimension at most equal to a and, on the other hand, axially in the immediate vicinity of the collar, a groove which extends along a geometrical closed line inscribed in a square whose side is equal to a, this line comprising two opposite corners of said square and the two half-sides extending from each of these two corners.

In known fixing devices of this kind the cage is of a type intended to serve as a nut for a metal screw cutting its thread in the thickness of the lateral wall of the socket, and the mounting of this cage in the slit is effected by axially inserting said cage in said slit, with its above transverse direction perpendicular to the edges of the slit, then by starting to introduce the screw into the cage and rotating this latter a quarter of a turn by means of the screw, the desired fixing then being completed by continuing to rotate the screw in the same direction, which deforms the cage radially and locks the whole.

In this case, mounting the cage involves the screw : it would not be very expedient to carry out the mounting in question independently of this screw, i.e. well before fixing by screwing itself, considering the ease with which the fitted cage can be removed, a simple quarter of a turn in the opposite direction to the preceding one followed by axial removal being all that is required.

The invention concerns, among the devices of the above kind, those in which the cage is intended to contain with play a metal threaded part (nut or bolt).

Its aim is especially to allow the portions of these devices intended to coact with the slits of the metal plates to be mounted so that the mounting is substantially irreversible and yet allows multiple adjustments of position of great amplitude parallel to the edges of said slits, without any risk of accidental removal.

To this end, the fixing devices of the kind in question are essentially characterized in that the closed line defining the bottom of said groove of the socket thereof comprises furthermore two opposite arcs of a circle of radius a/2, centred at the centre of the square, extending respectively from the two opposite ends of said two half-sides which are perpendicular to said transverse direction, the end of each arc of a circle the furthest away from the middle of the side of the square where this arc originates being connected to an excentric boss.

In preferred embodiments, recourse is had further to one or the other of the following arrangements:
each said boss is formed by the tangent extending one of the arcs of a circle beyond the end thereof opposite the middle of the corresponding side of the square as far as the side contiguous of this square,
said groove is delimited by the collar and by two radial tongues extending in a transverse direction perpendicular to said transverse direction,
in a device in accordance with the preceding paragraph, each tongue has a chamfered end on its face situated on the same side as the collar,
the threaded part being of a wing type, the cage is hollowed out laterally to form two longitudinal windows adapted to receive and guide said wings and extending as far as the collar and each tongue has passing therethrough in the central zone thereof one of these two windows and is divided thereby into two narrow lugs,
the threaded part being of the wing type, the cage is hollowed out laterally to form two longitudinal windows adapted to receive and guide said wings and extending as far as the tongues.

The invention comprises, apart from these principal arrangements, certain other arrangements which are used preferably at the same time and which will be more explicitly discussed hereafter.

The above and other objects, features and advantages of the present invention will become apparent from the following description given solely by way of non limiting illustration, when taken in conjunction with the accompanying drawings.

Figure 2:
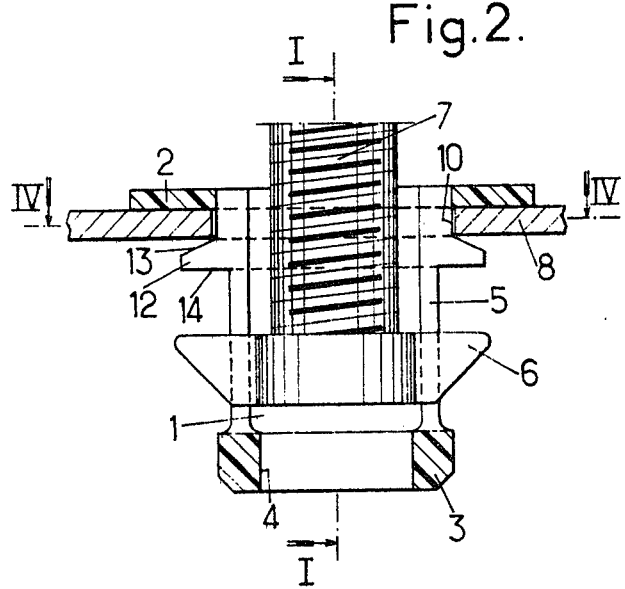
Figure 3:
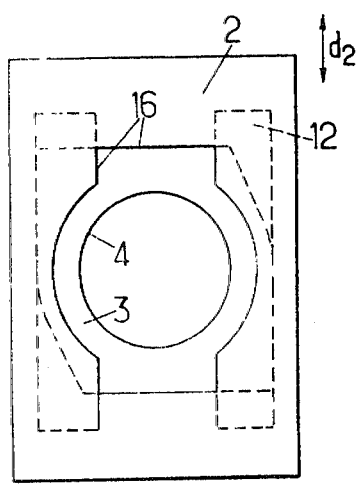
Figure 4:
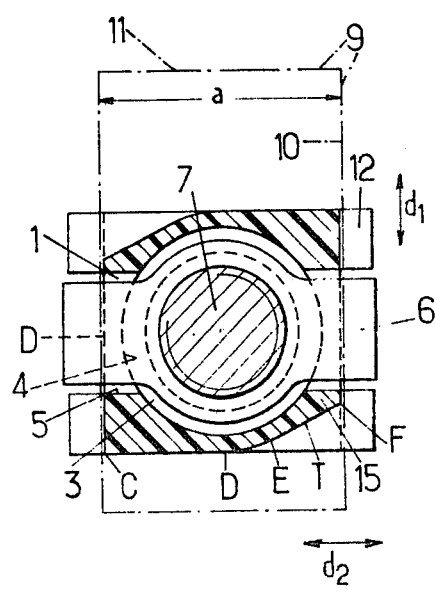

FIGS. 1 to 4 of these drawings show respectively in an axial section along I—I of FIG. 2, in an axial section along II—II of FIG. 1, in a top view and in cross section along IV—IV of FIG. 2, a fixing cage constructed in accordance with the invention, this cage being provided in FIGS. 2 and 4 with a wing-bolt.

In a way known per se, the cage shown in FIGS. 1 to 4 is formed from a moulded monobloc part made from a sufficiently strong plastic material such as a polyamide (Nylon) or a fluorinated polymer (P.T.F.E. or similar), this part comprising a cylindrical or prismatic socket 1 bounded at one of its ends by a projecting radial collar 2.

The bottom 3 of this socket opposite the collar has a hole 4 therethrough and its lateral wall is hollowed out to form two longitudinal windows 5 adapted to serve as a housing and guide for the two wings 6 of a bolt 7 (FIGS. 2 and 4).

In the best known constructions, these cages are intended to be fixed at very precise positions in metal plate 8 accessible from only one side, notched circular holes being provided at these positions.

The holes with which said cages are intended to cooperate are here rectangular holes or slits 9, having two parallel edges 10 separated from each other by a distance a.

The two other edges 11 of these slits may have any desirable shape : they are generally formed by two rectilinear segments parallel to each other and perpendicular to the edges 10 so as to form therewith a rectangle, said other edges 11 forming the two small sides of this rectangle.

The transverse section of socket 1 must of course be sufficiently small to be able to be inserted in slit 9.

The socket has, with this end in view, at all its points in one of its tranverse directions $d_1$ (FIG. 4), a dimension at most equal to a.

It may be delimited by a circle of diameter a.

In a particularly advantageous embodiment, it is delimited by a square of side a or by a rectangle whose small side is equal to a.

Furthermore, and in accordance with the invention, two tongues 12 project radially outwardly from the lateral wall of socket 1, in the transverse direction $d_2$ perpendicular to $d_1$, these tongues being symmetrical in relation to the axis of the socket and disposed at an axial distance from collr 2 equal to the thickness of the thickest metal plate 8 likely to be used for mounting the cage.

The ends of these tongues 12 are preferably chamfered on their transverse face 13 disposed on collar 2 side.

The other face of each tongue 12 may be purely transverse, as in the embodiment illustrated in FIG. 2, or on the contrary oblique, sloping at 45° to the axial direction so as to be reinforced by being joined less abruptly to the rest of the lateral wall 1 of the cage.

Each of these two tongues 12 defines, with collar 2, a groove or slide.

The periphery of the cage at the level of the bottoms of these grooves extends along a closed geometrical line inscribable in a square of side a.

The form of this line is chosen so as to allow the cage to rotate by a quarter of a turn—and only a quarter of a turn—in the screwing direction of this cage, after axial insertion thereof in slit 9 until the collar 2 thereof abuts against the edges 10 of this slit.

Said line is, with this object in view, symmetrical in relation to the axis of the cage, i.e. to that of the square considered and it comprises:

on the one hand, two opposite corners C (FIG. 4) of said square each extended by a half-side of this square as far as two points D, and, on the other hand, two arcs of a circle E of radius a/2 originating respectively at the two points D which are staggered angularly by 45° about the axis of the square in relation to the two corners C, in the anticlockwise direction when observing the cage from above (the collar then being assumed disposed at the upper part of the cage).

If the two arcs of a circle E is question extend, in the anticlockwise direction thus defined, and from the corresponding point D, over a quarter of a circle, the rotation of a quarter of a turn in the clockwise direction corresponding to mounting the cage would effectively be possible but, after being effected, nothing would stop identical rotation in the opposite direction which is a drawback in all cases where it is not desired to be able to remove the cage easily from slit 9 before it is finally fixed thereto by screwing.

To get over this drawback of premature accidental removal, a "pawl" effect is provided during the quarter of a turn fitting of the cage of the edges 10 of the slit : in this case the force required for generating this quarter of a turn increases slightly until a threshold is passed after which it decreases to become even zero or superfluous, the cage itself completing its rotation to position itself in its stable angular position in which it assumes an orientation perpendicular to its original orientation, i.e. corresponding to its axial insertion into the slit.

This result is obtained by providing an excentric boss 15 (FIG. 4) on the portion of each said arc of a circle E the farthest removed from the corresponding point D.

Such bosses may be formed by limiting the extent of these arcs of a circle E to an angle less than 90°, e.g. to an angle of 45° or 30° only, these arcs then being extended at their ends opposite points D by their tangents T as far as points F where they meet with the following sides of the square.

Each of the two tongues 12 is hollowed out to form two windows 5 which extend as far as collar 2 : it is then divided by this window into two relatively narrow lugs extending respectively on each side of said window.

The cage described above works as follows.

This cage is previously provided its bolt 7 having wings 6 which is for example forcibly inserted through a notched opening 16 (FIG. 3) hollowed out in the centre of collar 2.

Then said cage is orientated so that its direction $d_2$ is parallel to the edges 10 of slit 9 and it is inserted axially into this slit until its collar 2 abuts against said edges.

This insertion is guided by the lateral wall of the socket sliding along the edges in question : this guiding is particularly precise when said wall comprises flat faces or portions of faces extending parallel to direction $d_2$.

After said insertion, the cage is rotated by a quarter of a turn in the direction of its screwing, this rotation requiring over-riding of a "hard point" close to the end thereof, because of the presence of bosses 15 or similar provided in the way described above.

During this rotation, the two slides formed respectively each by a tongue 12 and collar 2 overlap the edges 10 of slit 9.

This operation is facilitated by the chamfered shape of tongues 12, in particular when the metal plate is relatively thick : said shape facilitates moreover the use of metl plates of different thicknesses.

At the end of the rotation considered, two half-sides of the square in which are inscribed the bottoms of said slides abut angularly against edges 10 and therefore act as end travel stops.

The cage is then axially locked in the slit because of the axial overlapping of the edges 10 of this slit by the two slides.

It is also angularly locked because of the presence of the excentric bosses 15.

But it may slide along edges 10, which are then overlapped, with an easy fit or even with clearance, by the two slides and are then parallel to direction $d_1$ of the cage, as illustrated in FIG. 4.

This possibility of sliding is particularly advantageous for a number of applications, and in particular in the case when it is difficult to determine in advance with precision the position of the cage in relation to its final position on metal plate 8 in the direction of the edges 10 of the slit : this is in particular the case when it is desired to fix on a single chassis by means of several cage devices of the kind indicated, a large sized part whose dimensions are difficult to control with accuracy, e.g. within a few millimeters, because especially of its moulded manufacture or because of limitation relative to heat distortions.

After final adjustment of the position of the cage on the plate, all that is required to secure the desired part to this plate is to pass the threaded shank of bolt 7 through an aperture in this part then to screw a nut on the end of this shank projecting beyond said aperture until, on the one hand, said nut is clamped against said part and, on the other hand, the wings 6 of bolt 7 are clamped against the hidden face of plate 8 or more precisely of its edges 10.

It is to be noted that this final screwing is effected in the same direction as the quarter of a turn for mounting the cage on the plate, so that this screwing carries no risk at all of removing the cage angularly and that, on the contrary, it reinforces the security of mounting of this cage.

It is also to be noted that the periphery of the collar may have any desirable shape, in particular circular or square, provided that its size in all the transverse directions is greater than the width a of slit 9 : in the embodiment illustrated in FIG. 3, this periphery is rectangular and has the two largest sides of the rectangle in transverse direction $d_2$ along which tongues 12 extend, which facilitates a relatively instinctive mounting of the cage in slit 9, since it is this direction $d_2$ which must be initially oriented parallel to the edges 10 of this slit.

Numerous variations may be envisaged.

In particular, the windows 5 may stop at the level of tongues 12 and not at collar 2 : in this case, the wings 6 of the bolt bear axially at the end of clamping against the central portions of said tongues 12, which tongues are no longer then divided by the windows, and apply axially these central portions against plate 8.

According to another variation, the threaded part contained in the cage may be a wing-nut and not a wing-bolt, the threaded outer part called on to coact with the cage then being a bolt and no longer a nut.

According to yet another variation, a rigid sleeve integrally moulded with the cage may be provided on collar 2, on the side opposite socket 1, so as to make possible the mounting of a part (plate or similar) on plate 8 at a certain distance therefrom.

It should be mentioned that it has already been envisaged before the invention to provide on a resilient attachment a groove whose profile recalls that described above, but in this case the fixing was provided, at the same time as mounting, by the permanent urging apart of two free resiliently flexible lugs and the "over-riding" of the hard point urged these lugs to bend; in the construction of the invention, there is no flexible lug and no deformation of the cage takes place during fixing; this total absence of deformation of the cage during fixing has the advantage of perfect reversibility of this fixing, the screwing-unscrewing cycle of the metal parts causing no fatigue of the cage.

Following which, and whatever the embodiment adopted, there is finally provided a device for fixing by screwing to a blind plate or similar support, whose construction, use and advantages (in particular that of allowing mounting which is only voluntarily reversible, as well as, for the preferred embodiments, the facility of adapting to a plurality of plates of different thicknesses), follow sufficiently from what has gone before.

It is apparent that within the scope of the invention, modifications and different arrangements may be made other than are here disclosed. The present disclosure is merely illustrative with the invention comprehending all variations thereof.

We claim:

1. A device for fixing an object by screwing it to at least one blind plate or similar support having a mounting slit extending therethrough with parallel edges of width a, comprising two independent screwing elements adapted to cooperate with one another, the first of which comprises a cage made from a plastic material formed by a cylindrical socket extended by a radial collar, said socket having, on the one hand, at all its points in a transverse direction a dimension at most equal to a and, on the other hand, axailly in the immediate vicinity of said collar a groove which extends along a geometric closed line inscribed in a square whose side is equal to a, this line comprising two opposite corners of said square and the two half-sides extending from each of these two corners, wherein the first screwing element comprises further a threaded metal part housed in the cage and wherein the closed line comprises further two opposite arcs of a circle of radius a/2, centred at the centre of the square, extending respectively from the two opposite ends of said two half-sides which are perpendicular to said transverse direction, the end of each arc of a circle the furthest removed from the middle of the side of the square where this arc originates being connected to an eccentric boss.

2. The fixing device as claimed in claim 1, wherein each boss is formed by the tangent extending one of the arcs of a circle beyond the square as far as the contiguous side of this square.

3. The fixing device as claimed in claim 1, wherein said groove is delimited by said collar and by two radial tongues extending in the transverse direction perpendicular to said transverse direction.

4. The fixing device as claimed in claim 3, wherein each tongue has one chamfered end on the face thereof situated on the collar side.

5. The fixing device as claimed in any one of claims 3 or 4, wherein the threaded part being of a wing type, the cage is hollowed out laterally to provide two longitudinal windows adapted to receive and guide said wings and extending as far as the collar and wherein each tongue has passing therethrough in the central zone thereof one of these two windows and is divided thereby into two narrow lugs.

6. The fixing device as claimed in any one of claims 3 or 4, wherein the threaded part being of a wing type, the cage is hollowed out laterally to provide two longitudinal windows adapted to receive and guide said wings and extending as far as said tongues.

* * * * *